(12) United States Patent
Rousseau et al.

(10) Patent No.: US 7,878,794 B2
(45) Date of Patent: Feb. 1, 2011

(54) MOULDING DEVICE FOR THE MANUFACTURE OF THERMOPLASTIC CONTAINERS BY BLOW MOULDING OR STRETCH-BLOW MOULDING

(75) Inventors: Nicolas Rousseau, Octeville-sur-Mer (FR); Laurent Danel, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 483 days.

(21) Appl. No.: 12/101,242

(22) Filed: Apr. 11, 2008

(65) Prior Publication Data

US 2008/0254161 A1    Oct. 16, 2008

(30) Foreign Application Priority Data

Apr. 13, 2007   (FR) .................................. 07 02695

(51) Int. Cl.
*B29C 49/56* (2006.01)
*B29C 49/58* (2006.01)

(52) U.S. Cl. ...................................... 425/535; 425/541

(58) Field of Classification Search ................. 425/522, 425/535, 541
See application file for complete search history.

(56) References Cited

U.S. PATENT DOCUMENTS 3,211,543 A * 10/1965 Koop .......................... 425/535
3,531,556 A * 9/1970 Mehnert ..................... 264/533
3,871,856 A * 3/1975 Trahan ......................... 65/261
4,299,549 A   11/1981 Suzuki et al.
4,497,622 A * 2/1985 Grebowiec .................. 425/535
4,545,953 A * 10/1985 Cage et al. .................. 264/533
6,464,486 B1 * 10/2002 Barray et al. ............... 425/535
7,004,745 B2 * 2/2006 Galloni ....................... 425/535
7,563,092 B2 * 7/2009 Mie ............................ 425/535
7,648,355 B2 * 1/2010 Dannebey ................... 425/535

FOREIGN PATENT DOCUMENTS

| GB | 2 388 364 A |   | 11/2003 |
|----|-------------|---|---------|
| JP | 60096434 A  | * | 5/1985  |
| JP | 03-178420 A |   | 8/1991  |
| WO | 97/13632 A  |   | 4/1997  |

* cited by examiner

*Primary Examiner*—Robert B Davis
(74) *Attorney, Agent, or Firm*—Sughrue Mion, PLLC

(57) ABSTRACT

Device for moulding thermoplastic containers by the blow moulding of preforms, comprising a mould (1) and a blowing assembly (2) with a nozzle (16) that can move axially between a raised position and a blowing position in fluid connection with a preform supported in the cavity of the mould. The half-moulds (3a, 3b) of the mould bear respective parts (Aa, Ab) together forming a male element (A) bordered by a wall (12) inclined towards the nozzle. The blowing assembly bears a female element (B) formed by a clamp (26) having an internal wall (30) complementary to the wall of the protuberance. In the blowing position, the cooperation between the male and female elements (A, B) locks the upper part of the closed mould.

13 Claims, 4 Drawing Sheets

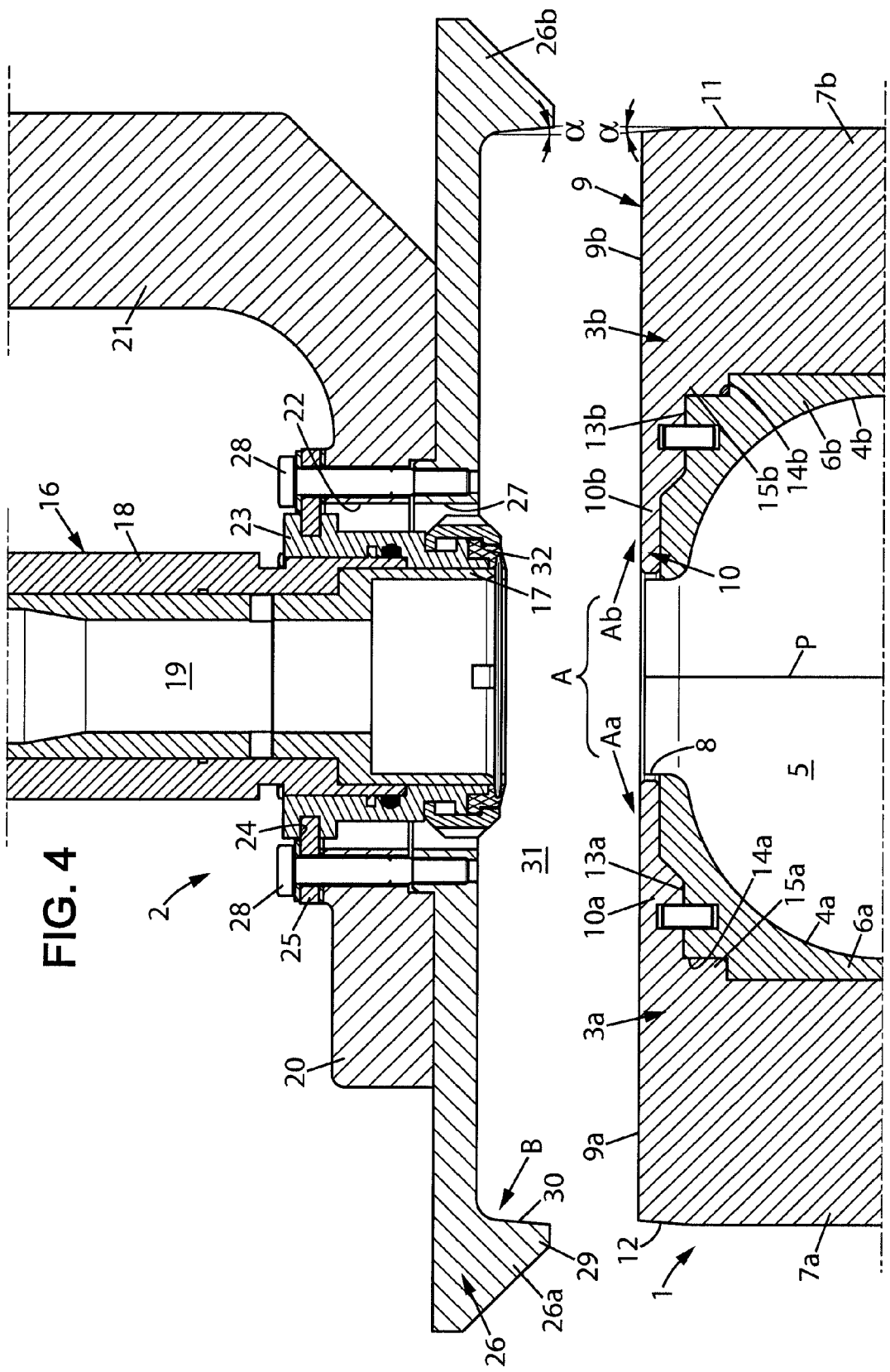

MOULDING DEVICE FOR THE MANUFACTURE OF THERMOPLASTIC CONTAINERS BY BLOW MOULDING OR STRETCH-BLOW MOULDING

FIELD OF THE INVENTION

The present invention relates in general to the field of manufacturing thermoplastic containers by the blow moulding or stretch-blow moulding of hot preforms in a mould with which a blowing assembly is associated, and it relates more precisely to improvements made to the moulding devices for the manufacture of thermoplastic containers by the blow moulding or stretch-blow moulding of hot preforms in a mould with which a blowing assembly is associated, said mould comprising at least two half-moulds that can move relative to each other between an open position in which the two half-moulds are away from each other and a closed position in which the two half-moulds are mated against each other along a mold parting surface and define an internal moulding cavity, said blowing assembly including a blowing nozzle and being movable axially above said mould between a raised position in which the end of the nozzle is raised above the mould and a lowered position or blowing position in which the end of the nozzle is in fluid communication with a preform supported in the cavity of the mould.

BACKGROUND OF THE INVENTION

In the configuration of blowing moulds comprising two mutually displaceable half-moulds (it being possible for the mould also to have a third part formed by a stationary or axially movable mould bottom), the two half-moulds are firmly fastened to each other during blowing. Thus, in moulds of the mutually articulated type commonly used in installations sold by the Applicant, the two half-moulds are articulated so as to rotate about a common axis parallel to one side (located to the rear) of the mold parting surface, whereas in the closed position of the mould clamping means mechanically fasten the two half-moulds together along the opposite side (located to the front) of the mold parting surface.

However, despite the very great mechanical rigidity obtained in the closed position by the moulds thus designed, it often happens, owing to the high blowing pressures commonly employed (in practice around $40 \times 10^5$ Pa), that the two half-moulds move apart (gaping) in the upper part of the mold parting surface, on the upper face of the mould that has the opening for passage of the neck of the container treated (in the lower part of the mould, the presence of the mould bottom, fastened to the two half-moulds by tongue-and-groove assembly means, prevents this drawback).

Admittedly, this drawback is put to good use since it is in particular by this gaping that the air filling the moulding cavity can escape, this air being forced out by the increase in volume of the container during blowing. In addition, it is common practice for the edges of the upper contacting faces of the half-moulds, which constitute the upper part of the mold parting surface, to be specifically machined so as to facilitate venting via this means.

Nevertheless, the fact remains that this gaping in the upper part of the mould constitutes a drawback that practitioners have always desired to avoid, the venting air from the moulding cavity having to be able to be evacuated via other means (for example machined venting channels through the wall of the half-moulds).

SUMMARY OF THE INVENTION

The object of the invention is specifically to remedy this well-known drawback and to propose a novel technical solution capable of meeting the expectations of the art.

For these purposes, the invention proposes a moulding device as explained in the preamble which, being designed in accordance with the invention, is characterized in that the two half-moulds comprise, on or close to their respective faces turned towards the blowing nozzle, two respective parts which, in the closed position of the mould, together define a male element at least partly bordered externally by a lateral wall inclined towards the blowing nozzle and in that the blowing assembly comprises a female element which is at least partly bordered internally by a lateral wall inclined complementarily to the inclination of the lateral wall of said male element and which is dimensioned so as to be capable, in the blowing position of the blowing assembly, of tightly clamping said male element of the closed mould.

Thanks to this design, the female element, in the closed position of the mould, covers the male element and, owing to the cooperation between the respective inclined surfaces, forces the top parts of the two half-moulds towards each other and performs a veritable auxiliary mechanical locking function which supplements, in the top of the mould, the clamping action provided by the conventional clamping means placed laterally.

In addition, the specific means implemented within the context of the invention are not very complicated to manufacture as well as to maintain, and as a result no substantial modification of the architecture and of the operation of the moulding device is required.

Advantageously, provision is made for the outer lateral wall of the male element of the mould to comprise at least two frustoconical portions that are substantially circularly arcuate and mutually positioned angularly so as to be approximately equidistant, and for the inner lateral wall of the female element of the blowing assembly to comprise at least two frustoconical portions that are substantially circularly arcuate and mutually positioned angularly so as to be approximately equidistant and in coincidence with said respective frustoconical portions of the lateral wall of the male element. Thus, the closing forces exerted on the top parts of the two half-moulds have respective radial and collinear resultants leading to well-balanced clamping of the two half-moulds.

In practice, simple measures may be taken to ensure that the outer lateral wall of the male element of the mould comprises two frustoconical portions that are substantially circularly arcuate and substantially diametrically opposed so as to be approximately symmetrical relative to the mold parting surface of the mould, and that the inner lateral wall of the female element of the blowing assembly comprises two frustoconical portions that are substantially circularly arcuate and substantially diametrically opposed and in coincidence with said respective portions of the lateral wall of the male element.

In a simple embodiment that involves no major modification in the conformation of the mould, measures could admittedly be taken so that the male element consists of the upper part of the mould itself and said lateral wall inclined towards the blowing nozzle is simply formed by the external wall of the upper part of the mould in the closed position, and so that the female element is dimensioned so as to at least partly cover the upper part of the mould in the closed position. Although such an embodiment is possible in principle, the female element would then have to have large dimensions, greater than the transverse dimension of the top part of the mould. This would result, in conjunction with its displacement during movement of the nozzle, in the need to have a voluminous free space above the mould whereas, in the installations of the kind in question, there is little space available.

Under these conditions, it may be preferable to make use of another embodiment, which is less complicated to implement and is currently the solution preferred by the Applicant, consisting in the male element consisting of a protuberance defined, in the closed position of the mould, by two projections provided on the respective faces of the half-moulds and turned towards the blowing nozzle, and in said lateral wall inclined towards the blowing nozzle being formed by the two respective lateral faces of said projections in the closed position of the mould.

In the latter case, in devices equipped with a nozzle of the bell-nozzle type, advantageously measures may be taken to ensure that the protuberance of the mould is in the general form of a plateau and constitutes a bearing plate for the bell of the nozzle in the blowing position. In the configuration commonly exploited in the moulding devices produced by the Applicant, consisting in each half-mould comprising an internal half-shell and an external brace supporting the half-shell, provision may be made for the projections to be fastened to the respective half-shells.

In yet another embodiment, which is also simple and not very complicated to implement, measures may be provided so that the male element consists of a mount defined, in the closed position of the mould, by two half-grooves provided on the respective faces of the half-moulds and turned towards the blowing nozzle and so that said lateral wall inclined towards the blowing nozzle is formed by the two radially inner faces of said half-grooves in the closed position of the mould. In this case, which is common in a number of blowing installations produced by the Applicant, in which each half-mould comprises an internal half-shell and an external brace supporting the half-shell, it may be advantageous for the half-grooves to be placed in the respective braces.

In a practical example, the blowing assembly may include a base surrounding the terminal part of the nozzle and the female element being integral with said base. In this case, it may be advantageous to provide a symmetrical arrangement so that the female element formed by the clamp consists of two clamping pieces comprising said two substantially circularly arcuate frustoconical portions respectively and so that the two clamping pieces are supported by the base in a diametrically opposed manner.

In a practical embodiment, it is beneficial for the base, on the one hand, and the female element formed by the clamp or by each clamping piece, on the other hand, to be made of different materials, especially aluminium and steel respectively, the base itself possibly being in the form of a solid piece.

BRIEF DESCRIPTION OF THE DRAWINGS

The invention will be more clearly understood on reading the following detailed description of certain preferred embodiments given solely by way of purely illustrative examples. In this description, reference will be made to the appended drawings in which:

FIGS. 3 and 4 are sectional views, similar to that of FIG. 1, showing two other possible embodiments according to the invention.

DETAILED DESCRIPTION OF THE INVENTION

Figure 1:
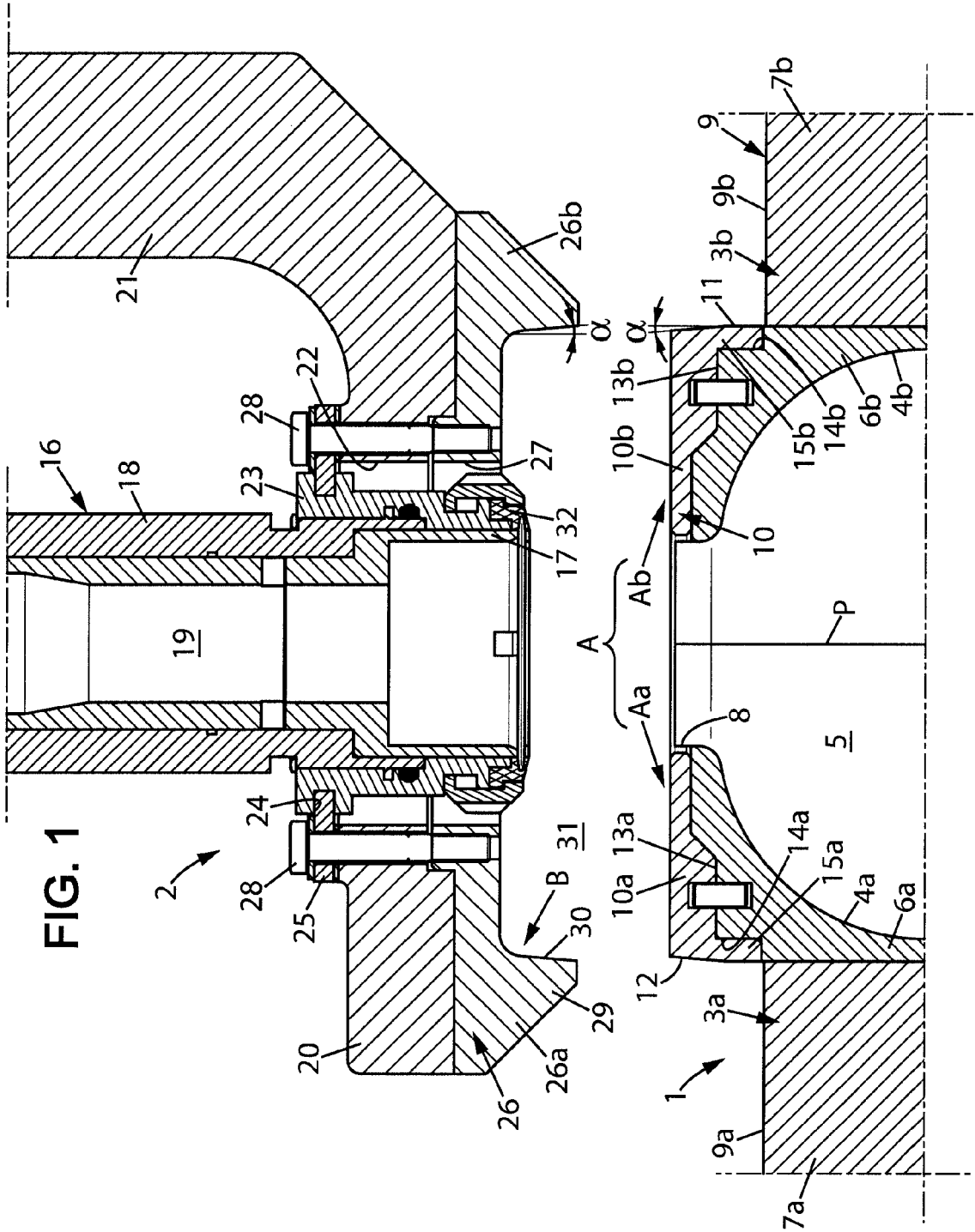
FIG. 1 is a sectional view of part of a moulding device according to the invention, showing, in a first operational position, a preferred embodiment of the respective parts of the mould and of the blowing nozzle that are required to mutually cooperate and are arranged in accordance with the invention.

Reference is firstly given to FIG. 1 in which only the mutually cooperating parts of a moulding device for the manufacture of containers, especially bottles, flasks, drums, etc., made of a thermoplastic such as PET, by the blow moulding or stretch-blow moulding of hot preforms, are shown, which parts are necessary for understanding the invention.

In FIG. 1, the parts involved in the invention comprise, respectively, a mould denoted in its entirety by the numerical reference 1 and a blowing assembly denoted in its entirety by the numerical reference 2. The mould 1 and the blowing assembly 2 are shown in a first operational position in which they are separated from each other, the blowing assembly being in the raised position with respect to the mould, whereas the mould is shown in the closed position to make understanding easier. In other words, the mould 1 and the blowing assembly 2 are shown in a position immediately prior to or immediately following the blowing phase (the container contained in the mould not being shown).

As regards firstly the mould 1, only the upper part thereof involved in the invention is shown. Implementation of the provisions of the invention that will be explained below is independent of the structure of the mould, and the mould can therefore be of any known type. FIG. 1 illustrates by way of example a type of mould commonly used by the Applicant in the installations that it produces, namely a mould of the "mutually articulated" type or "jacknife" mould. Such a mould generally comprises at least two half-moulds 3a, 3b which have, internally, respective half-impressions 4a, 4b and can move relative to each other by rotation about an axis (not visible in the drawing) between an open position in which the two half-moulds 3a, 3b are moved away from each other angularly and a closed position (shown in FIG. 1) in which the two half-moulds 3a, 3b are mated against each other along a mold parting surface P, the two half-impressions 4a, 4b joined together then forming an internal moulding cavity 5. The half-impressions are designed so that the cavity 5 is open to the outside via an opening 8 for accommodating the flange of the container or the preform.

Still by way of example and as is the case for most of the moulds used by the Applicant in the installations that it currently produces, in the mould 1 shown in FIG. 1 each half-mould 3a, 3b is formed from two closely assembled pieces, namely a respective half-shell 6a, 6b placed internally and having said corresponding respective half-impression 4a, 4b (it being possible for the half-shells to be made of a light metal, such as an aluminium alloy), and a respective shell-holder or brace 7a, 7b which is located to the outside and which constitutes, being for example made of steel, the rigid and mechanically strong structure of the half-mould. The half-shells 6a, 6b are fastened to the respective braces 7a, 7b by quick-fit means (not shown) allowing rapid assembly/disassembly.

In accordance with the invention, the two half-moulds 3a, 3b comprise, on or close to their respective faces 9a, 9b turned towards the blowing nozzle 16, two respective parts Aa, Ab, which, in the closed position of the mould, together define a male element A at least partly bordered externally by a lateral wall 11 inclined towards the blowing nozzle 16. In addition, the blowing assembly 2 comprises a female element B which is at least partly bordered internally by a lateral wall 30 inclined complementarily to the inclination of the lateral wall 11 of said male element A and which is dimensioned so as to be capable, in the blowing position of the blowing assembly 2, of tightly clamping said male element A of the closed mould 1.

Thanks to this arrangement, the cooperation between the female element B and the male element A locks the upper part of the mould 1 in the closed position.

Some possible embodiments of means arranged in accordance with the invention will now be described in greater detail.

Figure 2:
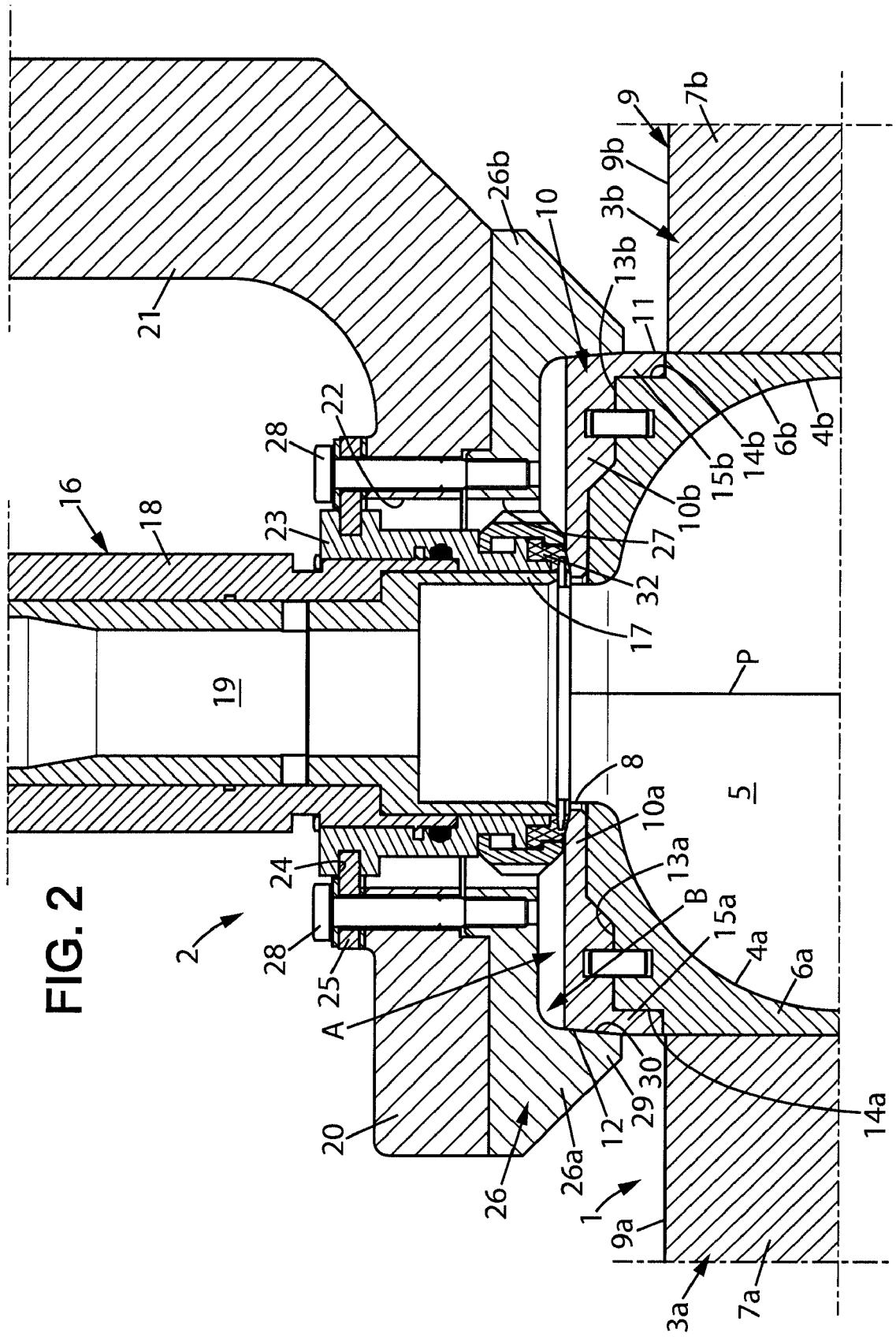
FIG. 2 is a sectional view of the parts of the moulding device of FIG. 1 shown in a second operational position.

In FIGS. 1 and 2 an embodiment is depicted which the Applicant currently considers to be the best embodiment and which is therefore preferred at the present time. In this arrangement, the upper face 9 of the mould is provided with a protuberance 10 that lies symmetrically on either side of the mold parting surface P and is bordered externally by a lateral wall 11, which wall includes at least one surface portion 12 which is inclined to the vertical upwards, that is to say towards the blowing assembly 2. The angle of inclination may be relatively small, that is to say less than about 20° and typically around ten degrees or so. It is this protuberance 10 that constitutes said male element A.

The protuberance 10 may have an outline of any desirable shape, but preferably this outline is circular, so that said surface portion 12 of the lateral wall 11 of the protuberance 10 is frustoconical with a conicity having an apex half-angle $\alpha$. The circular outline may be continuous or else, more advantageously, it may be discontinuous and formed from circular arcs. Owing to the arrangement of the mould in the form of two half-moulds 3a, 3b, the protuberance 10 consists of the combination of a set of several projections provided on the respective upper faces 9a, 9b of the half-moulds 3a, 3b and mutually positioned angularly so as to be approximately equidistant with an odd symmetry, or preferably an even symmetry, with respect to the mold parting surface P.

More precisely in the specific embodiment illustrated in FIG. 1, the protuberance 10 is formed by the combination of two projections 10a, 10b carried by the two half-moulds 3a, 3b respectively. The lateral wall 11 of the protuberance 10 then has two frustoconical surface portions 12 placed so as to be diametrically opposed, symmetrically with respect to the mold parting surface P, it even being possible for the protuberance 10 to be non-existent near the mold parting surface. It is these two projections 10a, 10b which constitute said two parts Aa, Ab respectively.

In the structure of the mould illustrated more particularly in FIG. 1 by way of example, the two projections 10a, 10b are provided on the respective upper faces 13a, 13b of the two half-shells 6a, 6b.

The projections 10a, 10b may surely be formed integrally in the upper parts of the half-moulds 3a, 3b respectively, and in particular of the half-shells 6a, 6b in the example illustrated in FIG. 1. However, it may prove to be more advantageous, especially if the blowing assembly includes a nozzle of the bell-nozzle type, for the projections 10a, 10b to take the form of pieces that are attached to the respective upper faces of the half-moulds, especially of the half-shells 6a, 6b as shown in FIG. 1. Thus, it is possible to provide the projections 10a, 10b with a sufficient radial dimension so that, in the closed position of the mould and during blowing, the protuberance 10 can take the form of a plateau adapted for acting at the same time as a bearing plate for a bell-nozzle, as shown in FIG. 1.

It is desirable, to ensure that the radial forces are taken up correctly, for the half-moulds 3a, 3b and the projections 10a, 10b to be provided with respective radially directed cooperating shoulders. Thus, as shown in the embodiment in FIG. 1, the half-moulds 3a, 3b, and more particularly the half-shells 6a, 6b in this example, have, on their upper edge, respective outwardly directed shoulders 14a, 14b that are diametrically opposed along a direction approximately perpendicular to the mold parting surface P. Complementarily, the two projections 10a, 10b terminate, on their outer edge, in respective skirts 15a, 15b projecting downwards and engaging with the respective shoulders 14a, 14b.

In addition, and particularly advantageously if the mould incorporates half-shells 6a, 6b made of light metal such as an aluminium alloy, the fact that the projections 10a, 10b are in the form of independent attached pieces allows to make them from a mechanically very strong material, for example steel, making them suitable for performing their function(s) effectively.

The blowing assembly 2 is illustrated by way of example in FIG. 1 in a nozzle configuration of the bell-nozzle type, with which many of the installations produced by the Applicant are currently equipped. However, it should be understood that the arrangements in accordance with the invention may be implemented in conjunction with a blowing assembly provided with a nozzle of another type, for example a nozzle for bearing on the neck or the mouth of the container.

The end piece of the nozzle (which is denoted in its entirety by the numerical reference 16) is configured in the form of a bell 17 supported on the end of a tubular stem 18 that can be moved approximately axially by drive means (not shown). The inside 19 of the stem 18 constitutes a duct for supplying the blowing fluid and conventionally houses an axially movable stretch rod (not shown). The arrangement of the rest of the blowing assembly does not fall within the context of the invention and can therefore be of any form.

A base 20 surrounds the lower part of the nozzle 16 to which it is mechanically fastened, the base 20 being also made integral with a column 21 forming part of the vertically movable equipment of the blowing assembly. In the embodiment illustrated in FIG. 1, the base 20 is made so as to be integral with the column 21, of which it constitutes the end part, the base 20 generally extending approximately perpendicular to the axial extent of the column 21; the base 20 has, placed approximately at the centre, a through-opening 22 through which the end part of the nozzle 16, and in particular the bell 17, is engaged.

As an example, the lower end of the nozzle 16 may be fastened to the base 20 as follows. The lower end of the nozzle 16 is provided with an external annular casing 23 provided with an annular groove 24 for accommodating a flat ring 25 projecting radially outwards while lying just above the base 20.

Fixed to the lower face of the base 20 is the female element B which, very advantageously and preferably, may be in the form of a clamp 26, said clamp 26 being of annular shape and having a central through-opening 27 in coaxial and dimensional coincidence with the opening 22 of the base 20.

The ring 25, the base 20 and the clamp 26 are provided with mutually aligned respective holes distributed over the perimeter of these parts, and threaded members 28 engaged in these aligned holes ensure that the ring 25 (and therefore the nozzle 16) is mechanically assembled to the base 20, while fastening the clamp 26 to the base 20.

The clamp 26 has a downwardly directed skirt 29 extending over at least part of the perimeter of the clamp 26. The skirt 29 has an inwardly directed lateral face 30 that is inclined away from the vertical by the same angle α as the surface portion of the lateral wall 11 of the protuberance 10. Thus, the skirt 29 defines, on the end of the nozzle 16, a hollow part 31, the dimensions and shape of which complement those of the protuberance 10.

In practice, the clamp 26 consists in general of a single piece. The clamp 26 may also consist, like the protuberance 10, of several pieces mutually positioned angularly so as to be approximately equidistant and arranged in an odd symmetry, or preferably in an even symmetry, with respect to the mold parting surface; thus, in the embodiment more particularly considered in relation to FIG. 1, the clamp 26 takes the form of two clamping pieces 26a, 26b that are supported by the base 20 in a diametrically opposed manner, facing the two respective projections 10a, 10b constituting the protuberance 10. The two clamping pieces 26a, 26b have two respective substantially circularly arcuate frustoconical lateral wall portions 30.

In FIG. 2, the mould 1 and the blowing assembly 2 are shown in a second operating position, which is the position occupied during blowing: the blowing assembly 2 is lowered so that the front edge of the bell 17 of the nozzle 16 is pressed in a sealed manner (a seal 32 is present on the front edge of the bell 17) against the upper face 9 of the mould 1.

During displacement of the blowing assembly 2, at the same time that the bell 17 has been lowered so as to be in sealed contact with the mould 1, the female element B formed by the clamp 26 is brought onto the male element A, here consisting of the protuberance 10 that said element B covers with close fitting of the respectively inclined lateral faces 30 and 12.

Under these conditions, when the blowing fluid under high pressure (typically around $40\times10^5$ Pa) is introduced into the container placed in the moulding cavity 5, the separation of the two half-moulds 3a, 3b is prevented not only by the means usually provided for this purpose (on both sides by the braces 7a, 7b articulated to their rotation spindle and opposed by specific clamping members, downwardly by the mould bottom), but in addition upwardly owing to the fitting of the clamp 26 over the protuberance 10. Under these conditions, the two half-moulds 3a, 3b remain perfectly mated over the entire mold parting surface P, and this results in better finished containers having a less pronounced trace of the mold parting surface.

Figure 3:
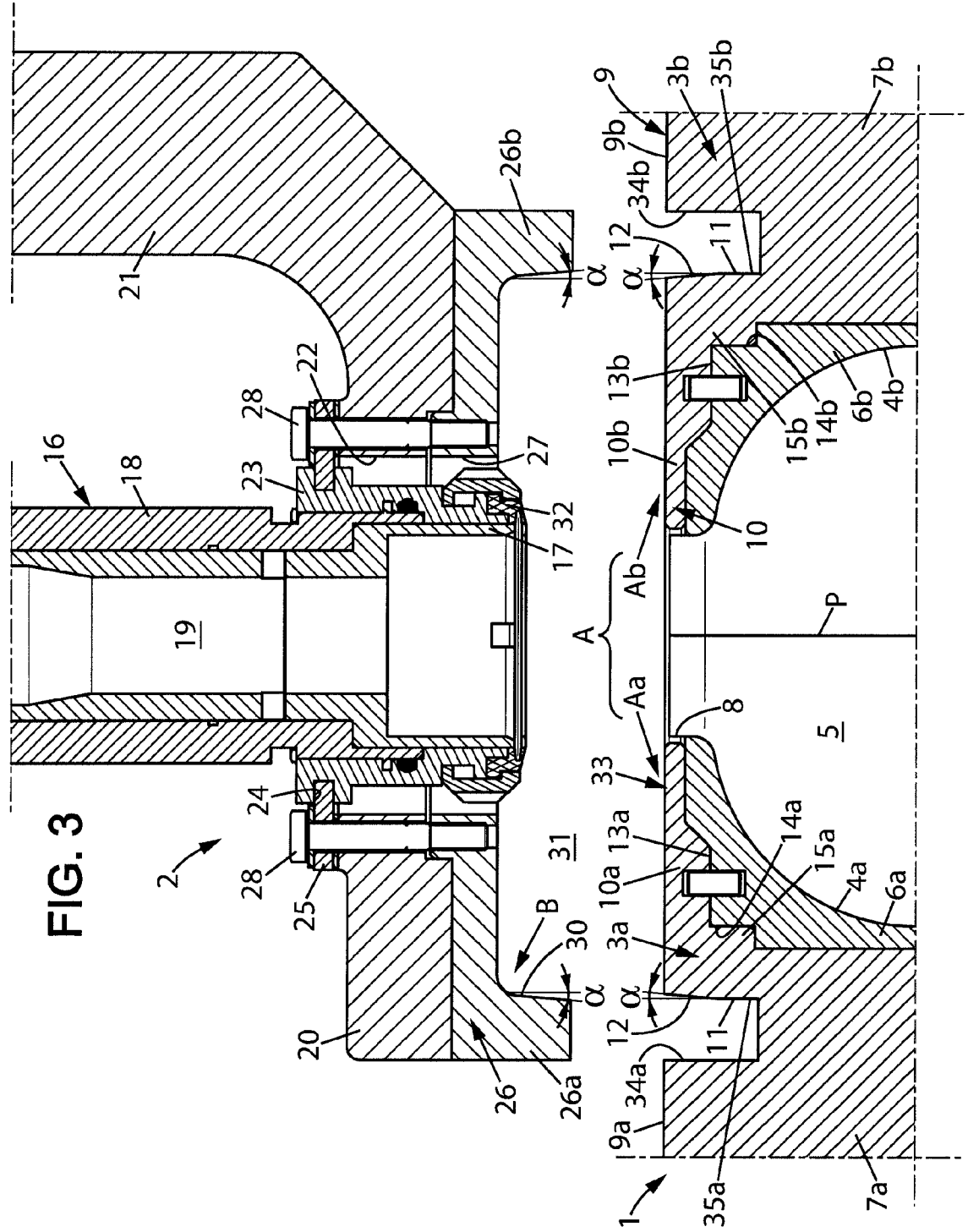

FIG. 3 shows another embodiment in which the male element A consists of a mount 33 defined, in the closed position of the mould, by two half-grooves 34a, 34b which are cut out in the respective faces 9a, 9b of the half-moulds 3a, 3b and are turned towards the blowing nozzle 16. The lateral wall 11 inclined towards the blowing nozzle 16 is formed by the two radially inner faces 35a, 35b of said half-grooves 34a, 34b in the closed position of the mould.

It will be understood that the embodiment shown in FIG. 3 constitutes a variant similar to the embodiment shown in FIGS. 1 and 2. Instead of projecting, like the protuberance 10, from the face 9 of the mould, the mount 33 is fitted into the mould with its upper face at the same level as the face 9 of the mould. The half-grooves 34a, 34b provide the necessary clearance so that the clamp 26 can fit onto the wall 11.

In this case, as is common in many blowing installations produced by the Applicant, in which each half-mould 3a, 3b comprises an internal half-shell 6a, 6b and an external brace 7a, 7b supporting the half-shell 6a, 6b, the half-grooves 34a, 34b may be provided in the respective braces 7a, 7b, as shown in FIG. 3.

FIG. 4 shows yet another possible embodiment, in which the male element A consists of the upper part of the mould itself and the lateral wall 11 inclined towards the blowing nozzle 16 is simply formed by the external wall of the upper part of the mould in the closed position. The female element B formed by the clamp 26 may, in turn, be identical to that indicated above with regard to FIGS. 1 and 2, except that here it is dimensioned so as to at least partly cover the upper part of the mould in the closed position.

This arrangement related to is perfectly achievable and advantageous in that it requires only a minimum adaptation of the mould (machining of the conical bearing surfaces 12). However, it must be recognized that in practice it is relatively difficult to implement because of the excessively large size of the female element B formed by the clamp 26. Not only this element is bulky owing to its dimensions, which must be greater than the transverse dimension of the upper part of the mould in order for it to be able to cover said part, but in addition it is necessary to provide above the mould a large free space for the movement of the element B that accompanies the nozzle in its vertical movements. The installations of the kind targeted by the invention comprise a large number of components and there is only little free space, in particular above the moulds.

What is claimed is:

1. Moulding device for the manufacture of thermoplastic containers by the blow moulding or stretch-blow moulding of hot preforms in a mould with which a blowing assembly is associated, said mould comprising at least two half-moulds that can move relative to each other between an open position in which the two half-moulds are moved away from each other and a closed position in which the two half-moulds are mated against each other along a mold parting surface and define an internal moulding cavity, said blowing assembly including a blowing nozzle and being able to move axially above said mould between a raised position in which the end of the nozzle is raised above the mould and a lowered position or blowing position in which the end of the nozzle is in fluid communication with a preform supported in the cavity of the mould, wherein said two half-moulds comprise, on or close to their respective faces turned towards the blowing nozzle, two respective parts which, in the closed position of the mould, together define a male element at least partly bordered externally by a lateral wall inclined towards the blowing nozzle, and in that said blowing assembly comprises a female element which is at least partly bordered internally by a lateral wall which is inclined complementarily to the inclination of the lateral wall of said male element and which is dimensioned so as to be capable, in the blowing position of the blowing assembly, of tightly clamping said male element of the closed mould, whereby the cooperation between the female element and the male element locks the upper part of the mould in the closed position.

2. Moulding device according to claim 1, wherein said outer lateral wall of the male element of the mould comprises at least two frustoconical portions that are substantially circularly arcuate and mutually positioned angularly so as to be approximately equidistant, and wherein said inner lateral wall of the female element of the blowing assembly comprises at least two frustoconical portions that are substantially circularly arcuate and mutually positioned angularly so as to be approximately equidistant and in coincidence with said respective portions of the lateral wall of the male element.

3. Moulding device according to claim 2, wherein said outer lateral wall of the male element of the mould comprises two frustoconical portions that are substantially circularly arcuate and substantially diametrically opposed so as to be approximately symmetrical relative to the mold parting surface of the mould, and wherein said inner lateral wall of the female element of the blowing assembly comprises two frustoconical portions that are substantially circular and substantially diametrically opposed and in coincidence with said respective frustoconical portions of the lateral wall (11) of the male element.

4. Moulding device according to claim 1, wherein said female element is a clamp.

5. Moulding device according to claim 1, wherein said male element consists of the upper part of the mould and said lateral wall inclined towards the blowing nozzle is formed by the external wall of the upper part of the mould in the closed position, and wherein said female element is dimensioned so as to at least partly cover the upper part of the mould in the closed position.

6. Moulding device according to claim 1, wherein said male element consists of a protuberance defined, in the closed position of the mould, by two projections provided on the respective faces of the half-moulds and turned towards the blowing nozzle, and wherein said lateral wall inclined towards the blowing nozzle is formed by the two respective lateral faces of said projections in the closed position of the mould.

7. Moulding device according to claim 6, in which the nozzle is of the bell-nozzle type, wherein said protuberance of the mould is in the general form of a plateau and constitutes a bearing plate for the bell of the nozzle in the blowing position.

8. Moulding device according to claim 6, wherein each half-mould comprises an internal half-shell and an external brace supporting the half-shell, and wherein said projections are fastened to the respective half-shells.

9. Moulding device according to claim 1, wherein said male element consists of a mount defined, in the closed position of the mould, by two half-grooves provided on the respective faces of the half-moulds and turned towards the blowing nozzle, and wherein said lateral wall inclined towards the blowing nozzle is formed by the two radially inner faces of said half-grooves in the closed position of the mould.

10. Moulding device according to claim 9, wherein each half-mould comprises an internal half-shell and an external brace supporting the half-shell, and wherein said half-grooves are provided in the respective braces.

11. Moulding device according to claim 1, wherein said blowing assembly includes a base surrounding the terminal part of the nozzle, and wherein said female element is fastened to said base.

12. Moulding device according to claim 11,
wherein said outer lateral wall of the male element of the mould comprises two frustoconical portions that are substantially circularly arcuate and substantially diametrically opposed so as to be approximately symmetrical relative to the mold parting surface of the mould,
wherein said inner lateral wall of the female element of the blowing assembly comprises two frustoconical portions that are substantially circular and substantially diametrically opposed and in coincidence with said respective frustoconical portions of the lateral wall of the male element,
wherein said female element is a clamp, in that said female element formed by the clamp consists of two clamping pieces comprising said two substantially circularly arcuate frustoconical portions respectively, and
wherein said two clamping pieces are supported by the base in a diametrically opposed manner.

13. Moulding device according to claim 11, wherein the base, on the one hand, and the female element formed by the clamp or by each clamping piece, on the other hand, are made of different materials, especially aluminium and steel respectively.

* * * * *